United States Patent
Bashir et al.

(10) Patent No.: US 12,542,714 B2
(45) Date of Patent: Feb. 3, 2026

(54) INCREMENTAL PLATFORM MIGRATION FOR TELECOMMUNICATIONS SYSTEMS

(71) Applicant: DISH Wireless L.L.C., Englewood, CO (US)

(72) Inventors: Kazi Bashir, Lewisville, TX (US); Mehdi Alasti, Arlington, VA (US); Siddhartha Chenumolu, Ashburn, VA (US)

(73) Assignee: DISH Wireless L.L.C., Littleton, CO (US)

( * ) Notice: Subject to any disclaimer, the term of this patent is extended or adjusted under 35 U.S.C. 154(b) by 102 days.

(21) Appl. No.: 18/394,994

(22) Filed: Dec. 22, 2023

(65) Prior Publication Data
US 2025/0211485 A1    Jun. 26, 2025

(51) Int. Cl.
*H04L 41/082* (2022.01)
*H04L 67/00* (2022.01)

(52) U.S. Cl.
CPC ............ *H04L 41/082* (2013.01); *H04L 67/34* (2013.01)

(58) Field of Classification Search
CPC .............................. H04L 41/082; H04L 67/34
See application file for complete search history.

(56) References Cited

U.S. PATENT DOCUMENTS

| 11,778,522 B2* | 10/2023 | Bartolome Rodrigo ..................... H04W 48/18 370/331 |
| 11,895,013 B1* | 2/2024 | Ganjali ................... H04L 45/02 |
| 2024/0179210 A1* | 5/2024 | Rodrigo .............. H04W 28/084 |
| 2024/0372783 A1* | 11/2024 | Majjiga ............... H04L 41/0806 |

* cited by examiner

*Primary Examiner* — Kamal M Hossain
(74) *Attorney, Agent, or Firm* — Kilpatrick Townsend & Stockton LLP

(57) ABSTRACT

Incremental platform migration for telecommunications systems is disclosed. Network Functions (NFs) and capacity on a new (target) platform are incrementally scaled up and NFs and capacity on a legacy (current) platform are scaled down until the migration to the target platform is completed. As such, if issues arise during migration, the legacy platform still retains capabilities while the issues with the target platform are addressed.

18 Claims, 18 Drawing Sheets

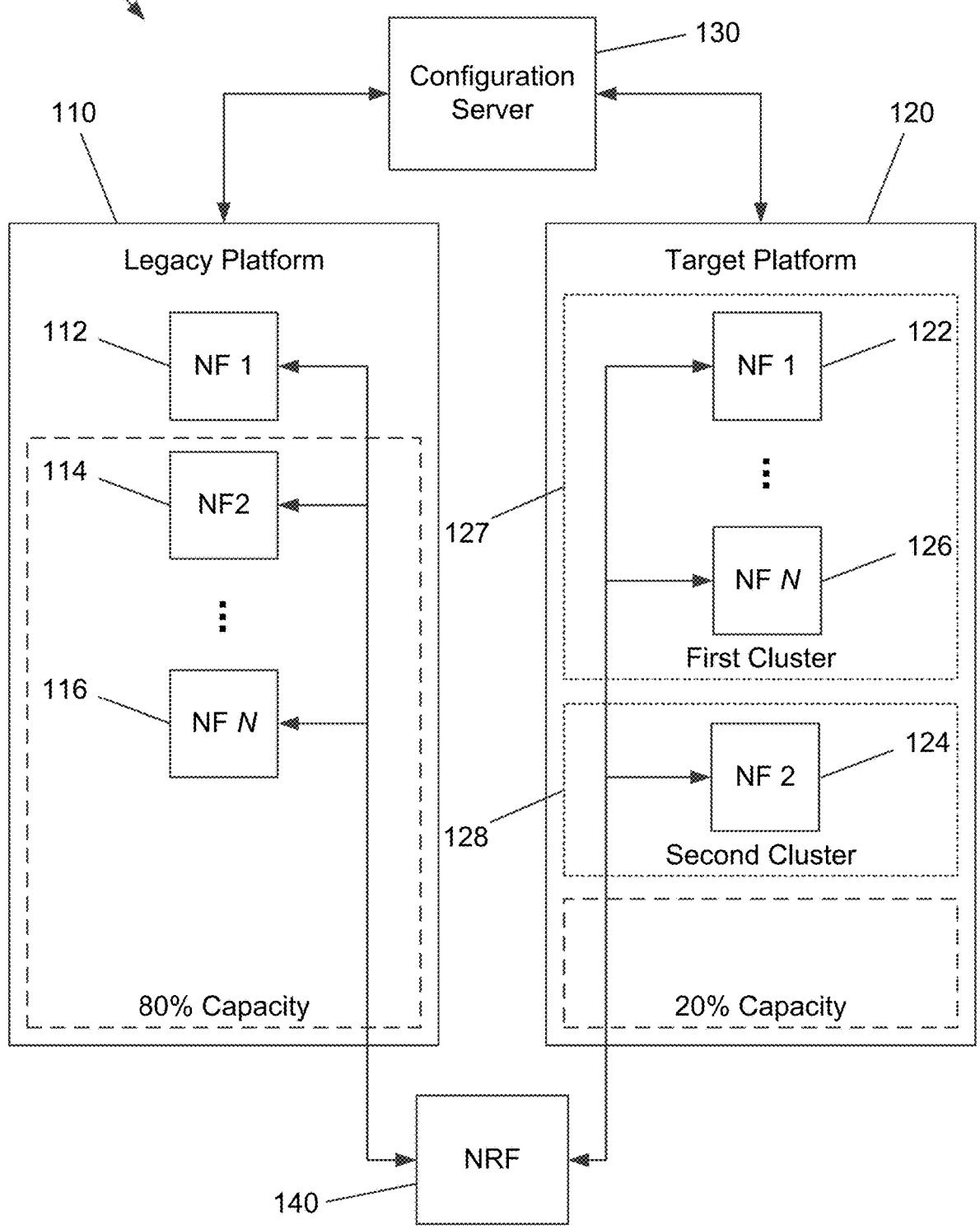

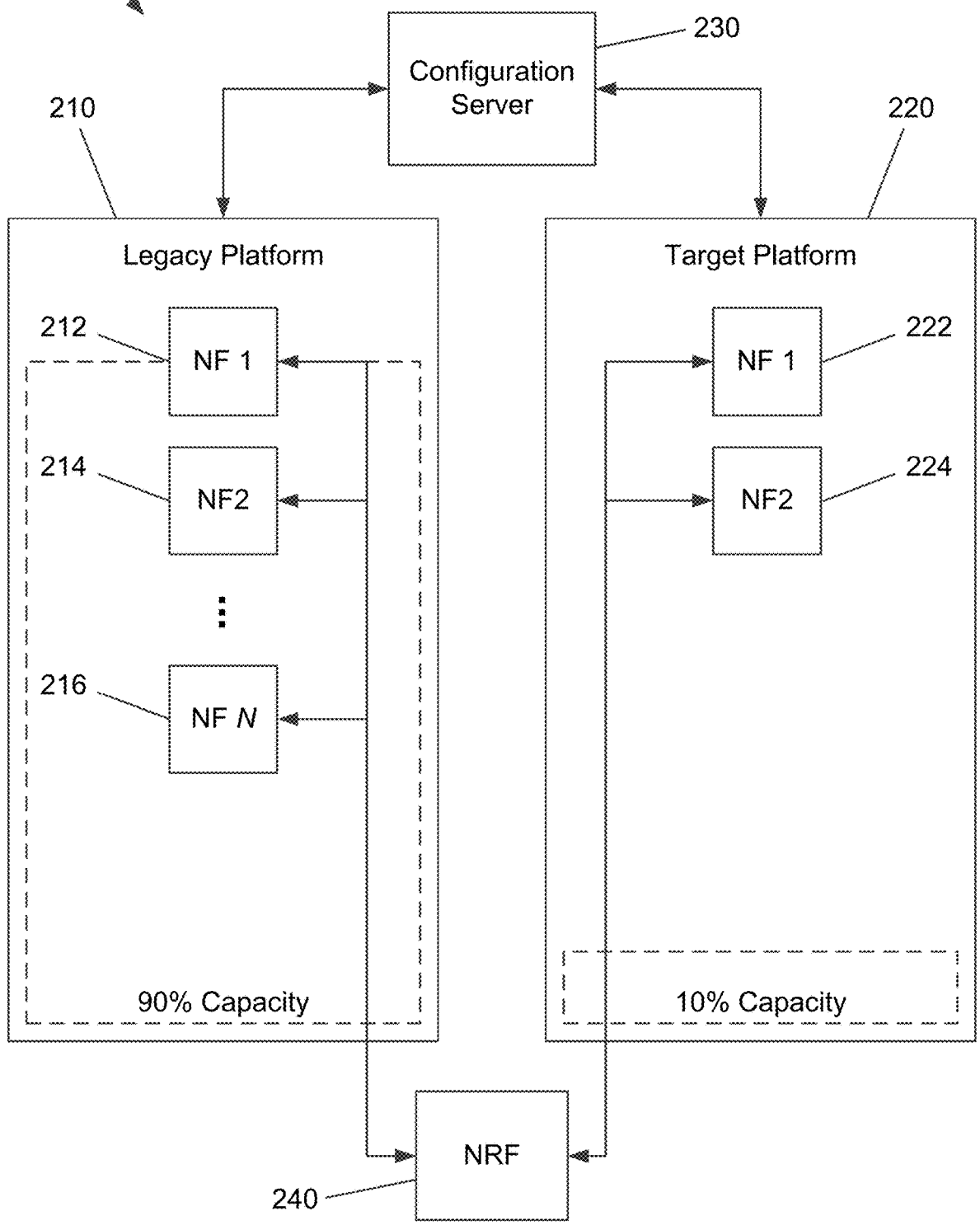

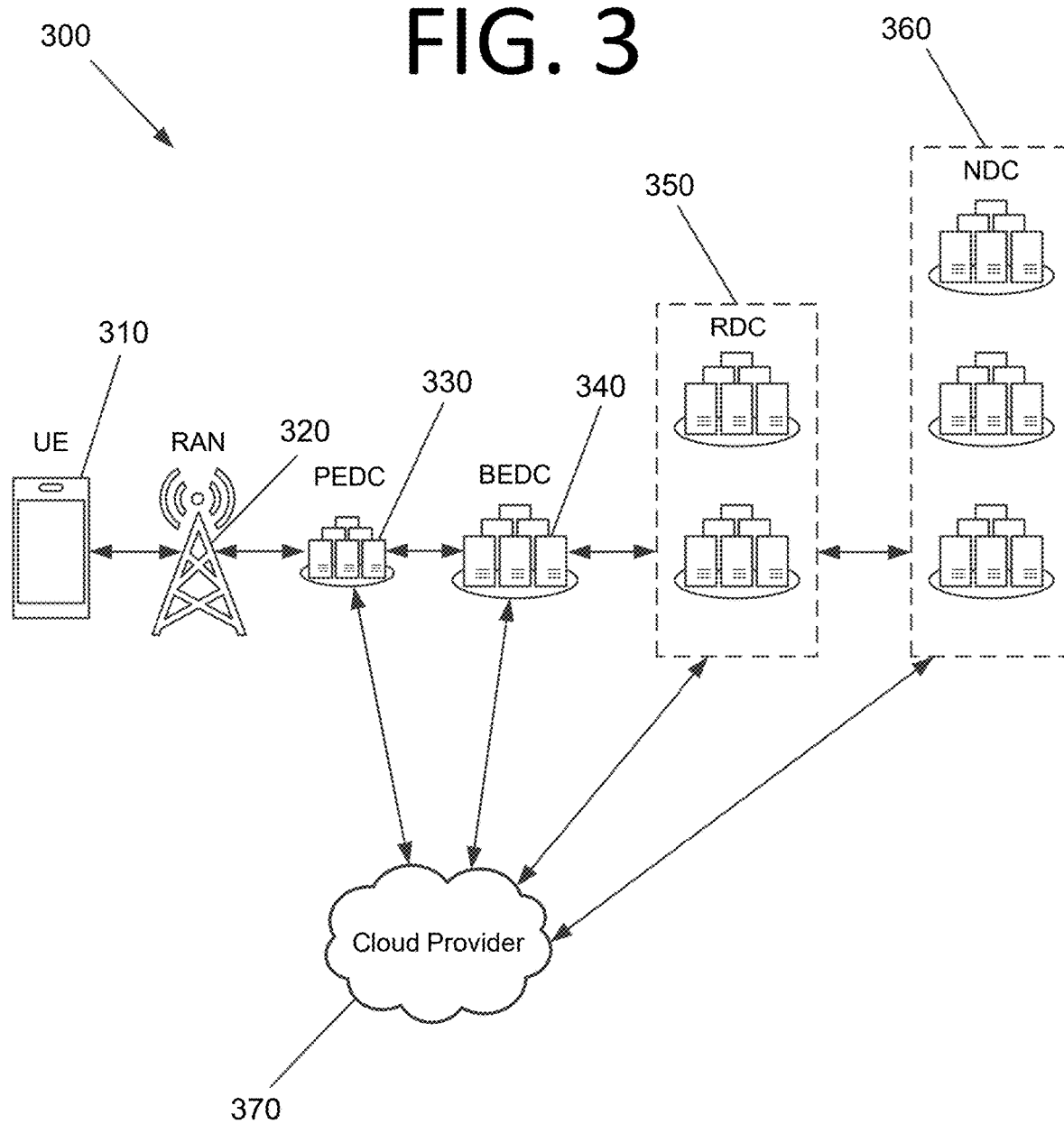

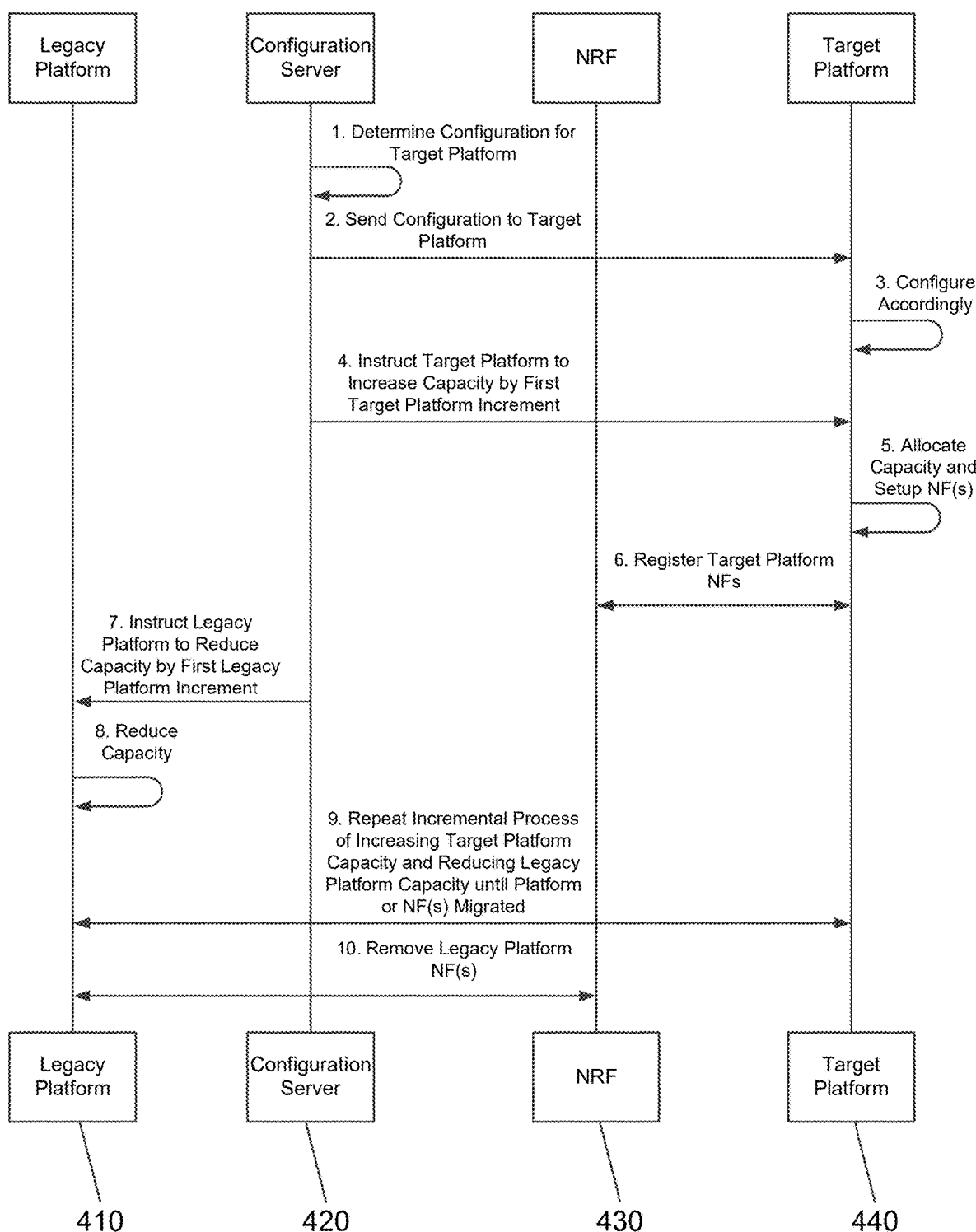

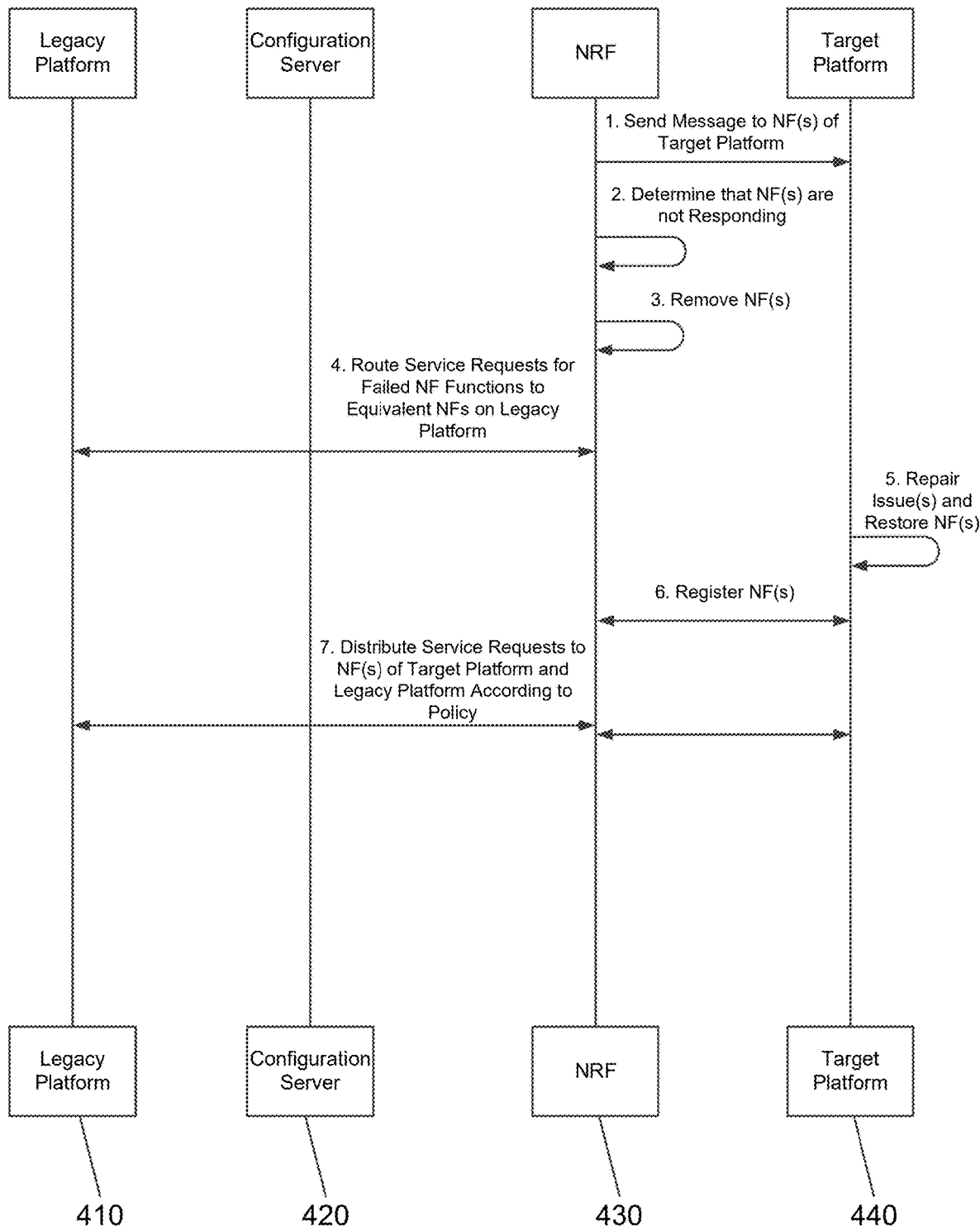

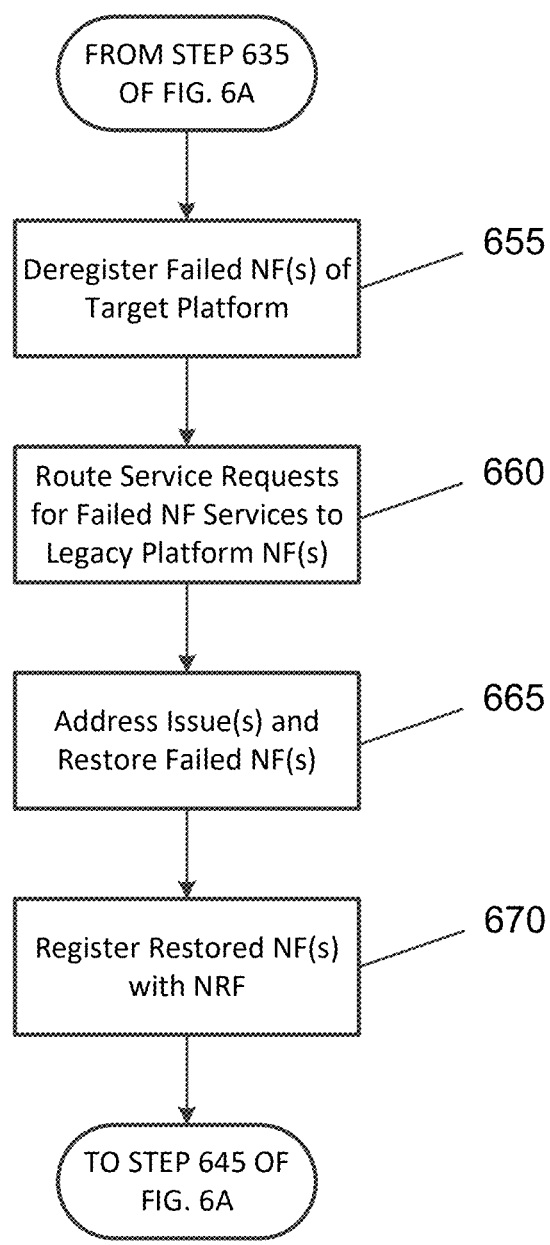

INCREMENTAL PLATFORM MIGRATION FOR TELECOMMUNICATIONS SYSTEMS

FIELD

The present invention generally relates to communications, and more specifically, to incremental platform migration for telecommunications systems.

BACKGROUND

Currently, migrating from one platform to another in telecommunications systems may not guarantee service continuity. Switching from one platform to another does not account for potential performance issues that may occur due to the characteristics of the platform being switched to. Accordingly, an improved and/or alternative approach may be beneficial.

SUMMARY

Certain embodiments of the present invention may provide solutions to the problems and needs in the art that have not yet been fully identified, appreciated, or solved by current communications technologies, and/or provide a useful alternative thereto. For example, some embodiments of the present invention pertain to incremental platform migration for telecommunications systems.

In an embodiment, a platform migration system for a telecommunications network includes one or more servers of a legacy platform running a plurality of Network Functions (NFs) and one or more servers of a target platform. The platform migration system also includes one or more Network Repository Function (NRF) servers that provide an NRF through which the plurality of NFs of the legacy platform are registered in the telecommunications network. The platform migration system further includes a configuration server configured to manage migration of one or more of the plurality of NFs of the legacy platform to the target platform using a migration policy. The configuration server provides one or more configuration files to the target platform. The one or more servers of the target platform implement the migration policy using the one or more configuration files, setup one or more NFs, and allocate an initial capacity for the target platform. The one or more servers of the legacy platform reduce a capacity of the legacy platform by a first increment. The NRF distributes service requests to the one or more NFs of the target platform and one or more corresponding NFs of the plurality of NFs of the legacy platform in accordance with the migration policy.

In another embodiment, a plurality of non-transitory computer-readable media store a plurality of computer programs. The plurality of computer programs are configured to cause a plurality of processors to configure a target platform in accordance with a migration policy in one or more configuration files, setup one or more NFs on the target platform, and allocate an initial increment of capacity to the target platform. The plurality of computer programs are also configured to cause the plurality of processors to reduce a capacity of a legacy platform by an initial increment. The plurality of computer programs are further configured to cause the plurality of processors to register the one or more NFs of the target platform with an NRF and distribute service requests, via the NRF, to the one or more NFs of the target platform and one or more corresponding NFs of the legacy platform in accordance with the migration policy.

In yet another embodiment, a computer-implemented method for performing platform migration for a telecommunications network includes configuring a target platform in accordance with a migration policy in one or more configuration files, by a plurality of computing systems The computer-implemented method also includes setting up one or more NFs on the target platform, allocating an initial increment of capacity to the target platform, and reducing a capacity of a legacy platform by an initial increment, by the plurality of computing systems. The computer-implemented method further includes registering the one or more NFs of the target platform with an NRF and distributing service requests, via the NRF, to the one or more NFs of the target platform and one or more corresponding NFs of the legacy platform in accordance with the migration policy, by the plurality of computing systems.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1F is an architectural diagram illustrating a multi-cluster solution to the failure scenario of FIG. 1E, according to an embodiment of the present invention.

FIG. 2A is an architectural diagram illustrating an initial increment in a platform migration system during migration of a subset of NFs, according to an embodiment of the present invention.

FIG. 3 is a telecommunications system, according to an embodiment of the present invention.

FIG. 4A is a flow diagram illustrating a process for performing incremental platform migration, according to an embodiment of the present invention.

FIG. 4B is a flow diagram illustrating a process for detecting and addressing NF failure, according to an embodiment of the present invention.

FIGS. 6A and 6B are flowcharts illustrating a process for performing incremental platform migration, according to an embodiment of the present invention.

Unless otherwise indicated, similar reference characters denote corresponding features consistently throughout the attached drawings.

DETAILED DESCRIPTION OF THE EMBODIMENTS

Figure 1A:
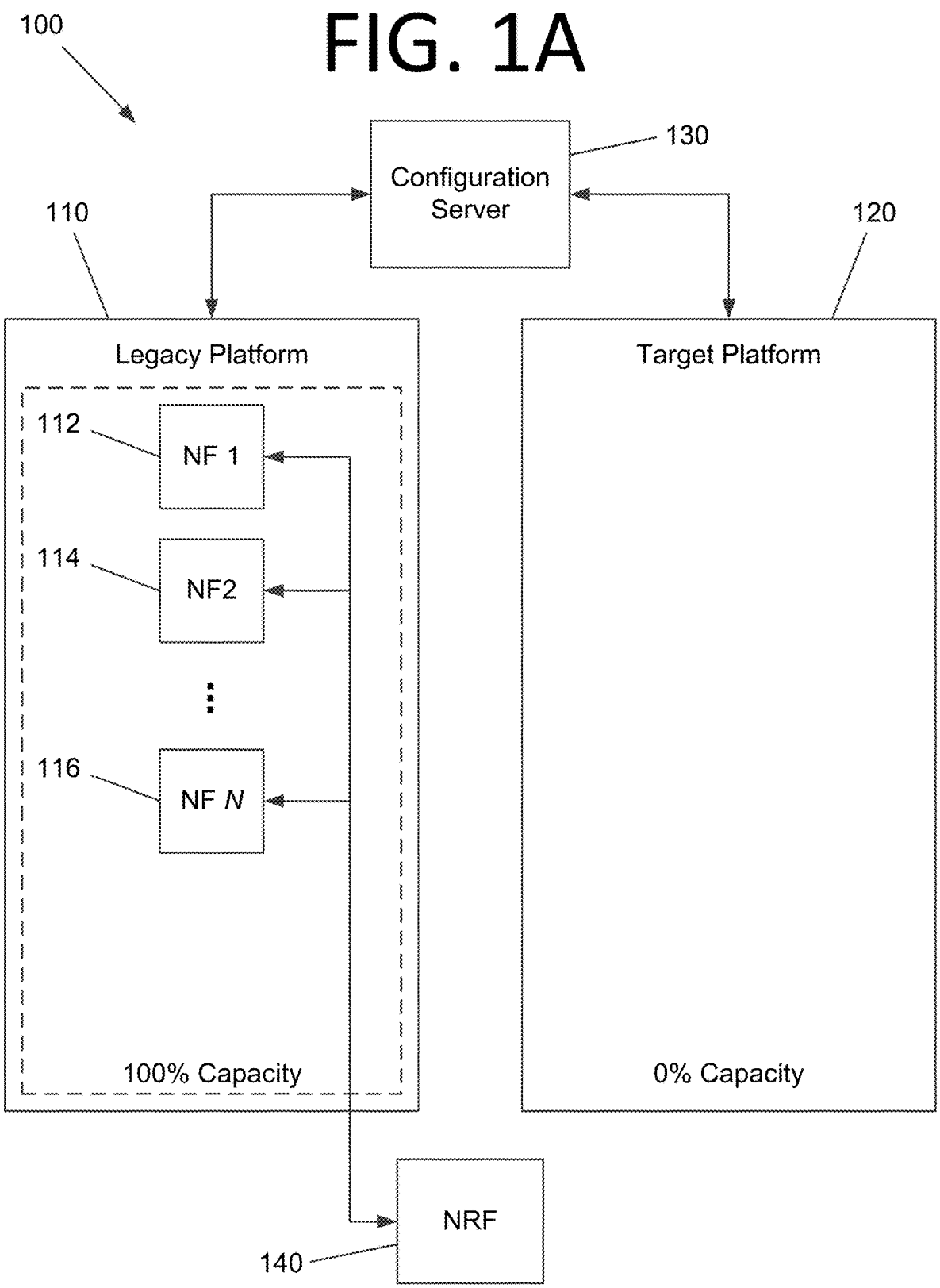
FIG. 1A is an architectural diagram illustrating an initial state of a platform migration system during a full platform migration, according to an embodiment of the present invention.

Some embodiments pertain to incremental platform migration for telecommunications systems. Such embodiments incrementally scale up the Network Functions (NFs) and capacity on the new (target) platform and scale them down on the legacy (current) platform until the migration to the target platform is completed. As such, if issues arise during migration, the legacy platform still retains capabilities while the issues with the target platform are addressed.

Previously, a service interruption occurred in the middle of the night during a period of relatively low traffic where the previous platform was taken down and the new platform was brought online. However, this takes down service for some users. Also, engineers have to work inconvenient hours for this approach.

Currently in 5G, there is a shift to virtualization, microservices, "cloudification," "everything-as-a-service," Continuous Integration and Continuous Delivery (CICD), etc. This trend will likely continue into 6G and beyond. Networks should be flexible, have a lower total cost of ownership, provide high security, have adjustable capacity, support creativity and innovation, support new services and verticals, etc. These trends can be mutually reinforcing and mutually supporting.

Embodiments aim to maintain service continuity during platform migration at runtime. The target platform may be a different cloud service provider or a new platform with an existing cloud service provider, for example. The target platform is added to the network with an appropriate initial capacity based on the operator's CICD strategy and preparation of the target platform. The target platform can provide a set of NFs of a different cloud vendor (e.g., migrating from an AWS® cloud to Microsoft Azure®, Google Cloud®, etc.) or a set of NFs from the same cloud vendor as the target platform in a different cloud environment. The legacy platform and/or target platform may be on premises or a public cloud platform.

Such embodiments thus provide a cloud-agnostic approach, and operators can switch based on lowest cost, superior performance for NFs, proximity to operator sites, etc. Alternatively, multiple clouds can be used at the same time for different NFs, and service continuity can be provided while migrating. For instance, a single NF, a group of NFs, or the entire platform may be migrated.

NFs in the target platform may be grouped together in the same cluster (e.g., a Kubernetes® cluster) or hosted in separate clusters to minimize the "blast radius" of an issue with an NF on the target platform (e.g., due to configuration issues). NFs and/or clusters of NF groups could be located at different sites to increase resiliency against problems with one of the sites. The NFs may be Containerized NFs (CNFs) at the microservice level.

Kubernetes® may be used to provide a portable, extensible, open source platform for managing containerized workloads and services that facilitates both declarative configuration and automation. Containers are similar to Virtual Machines (VMs). However, they have relaxed isolation properties to share the Operating System (OS) among the applications. Therefore, containers are considered lightweight. Similar to a VM, a container has its own file system, a share of Central Processing Unit (CPU) resources, memory, process space, etc. Since containers are decoupled from the underlying infrastructure, they are portable across clouds and OS distributions.

Kubernetes® runs workloads by placing containers into pods to run on nodes. A node may be a virtual machine or a physical machine, depending on the cluster design. Each node is managed by the control plane and contains the services necessary to run the pods. Typically, multiple nodes are included in a cluster.

A pod is the smallest and simplest Kubernetes® object, representing one or more running containers on a cluster that have shared storage and network resources, as well as a specification for how to run the containers. The contents of a pod are co-located and co-scheduled, as well as run in a shared context. A pod models an application-specific "logical host". It contains one or more application containers that are relatively tightly coupled. In non-cloud contexts, applications executed on the same physical or virtual machine are analogous to cloud applications executed on the same logical host. An example of a pod that consists of a container running the image dish:1.1.1 is provided below.

```
apiVersion: vi
kind: Pod
metadata:
  name: dish
spec:
  containers:
    name: dish
      image: dish:1.1.1
      ports:
        containerPort: 80
```

The control plane is the container orchestration layer that exposes the Application Programming Interface (API) and interfaces to define, deploy, and manage the lifecycle of containers. A container is a lightweight and portable executable image that contains software and all of its dependencies.

Each NF should have an appropriate configuration, which may be provided via Helm charts. A Helm chart is a package that contains all the necessary resources to deploy an application to a Kubernetes® cluster. This includes YAML ("Yet Another Markup Language" or "YAML Ain't Markup Language") configuration files for deployments, services, secrets, and config maps that define the desired state of the application.

NFs can be supported in active-active mode, where there is no standby network that is present to sync data and be available in case it is needed due to active NF failure. Instead, there is enough capacity to take over the load if something happens in the legacy platform or the target platform. In other words, if an NF of the active target platform fails, the corresponding NF of the active legacy platform takes over the load, and vice versa. This provides a redundancy model between the legacy platform and target platform NFs.

A common data platform may be used to provide a common Network Repository Function (NRF) that shares the service context, service parameters, etc. between the legacy and target platforms. Such a common data platform may be distributed and be part of the migration process so NFs in each platform can be discovered and used. Load balancers move services from the legacy platform to the target platform according to migration policies and based on the service migration timeline. These policies may include migrating 10% of the load at a time, migrating NFs individually or in groups, migrating NFs based on an ordering of certain customers or verticals, etc. For instance, services for a specific enterprise or specific verticals may be migrated first, then others, then others still, etc. Capacity is added to the target platform accordingly at each step (increment) of the migration process if the target platform is operating as intended. If not, the legacy platform still handles the NFs while the target platform is repaired. Corresponding capacity is incrementally removed from the legacy platform. This process is repeated until the existing platform is fully migrated to the target platform. The NFs of the legacy platform are then removed.

The NRF is a repository of profiles of the NFs that are available in the network, including via the legacy platform and the target platform. The NRF is used appropriately for the management of NFs, service discovery and registration, and authorization. The purpose of the NRF is to allow a service consumer (e.g., an NF) to discover and select suitable service producers (i.e., NFs and NF services) without having to be configured beforehand.

The NRF keeps a repository of the available NF instances and their exposed service instances. The repository is maintained dynamically by NF producers registering their so-called NF profile in the NRF. This, in turn, enables the NFs to discover other available NF instances, their service instances, and status dynamically. If one NF requires the services of another NF, it communicates with the NRF to find the other NF and communicate therewith. In other words, the NRF facilitates service discovery. The NF profile contains relevant data pertaining to the respective NF.

When a new instance of an NF is deployed or an existing instance is changed (e.g., due to scaling), the NRF is updated with the new profile information. The NRF can be updated by the NF itself or by another entity on behalf of the NF. There is also a keep alive mechanism that allows the NRF to maintain the repository and remove the profiles of missing or dormant NFs. The NF profile in the NRF contains information such as the NF type, address, capacity, supported NF services, and addresses for each NF instance. The information is provided to the NF service consumer in the discovery procedure and enough information for the service consumer to use the service-based interface of the selected NF and NF service. The NRF profile also contains authorization information, and the NRF only provides the profiles to a consumer that can discover the specific NF or service.

Communications between NF services on the control plane typically occur via HyperText Transfer Protocol 2 (HTTP2) Representative State Transfer (REST)-ful APIs. An NF service includes operations that are based on a request-response or a subscribe-notify model. Services are modeled as resources that are provisioned or can be created, updated, or deleted using RESTful HTTP2-based procedures.

Once an NF consumer has discovered NF producer instances, the NF consumer removes the NF producer instances that do not meet the desired service criteria (e.g., network slice, Data Network Name (DNN), etc.). From that smaller set, the NF consumer selects an NF producer instance, taking into account capacity, load, etc. If resources are created as part of a service request, the created resource is assigned a unique Uniform Resource Identifier (URI) pointing to the created resource.

The NRF provides three services to allow NFs and NF services to discover, select, and connect to peer NFs and NF services with the correct capabilities. These services are: Nnrf_NFManagement, Nnrf_NFDiscovery, and Nnrf_AccessToken. Nnrf_NFManagement enables NFs to register and manage their NF services and capabilities in the NRF. Nnrf_NFDiscovery allows NFs and NF services to discover other NFs and NF services that match the provided criteria. Nnrf_AccessToken allows the NFs to request Auth2.0 access tokens that can be used to access services from other NFs.

When determining how to deploy from the legacy platform to the target platform, one should consider how to design the cluster(s), where to put the NFs, etc. Per the above, a resilient architecture should take into account how to minimize the "blast radius" of NF failures. For instance, if there are ten NFs in a cluster and one NF is causing memory leaks, this harms the operations of the entire cluster. The design can be changed to locate the problem NF elsewhere in this scenario while the root cause of the memory leaks is investigated. In some embodiments, these operations may be fully automated.

A configuration server may be used to orchestrate and configure the target platform and try to set it up in a similar manner to the legacy platform. However, characteristics of the configuration for the target platform may not be precisely the same, particularly when migrating to a different cloud vendor's platform. In other words, the configuration server attempts to take the parameters from the legacy network and setup the NFs in the target platform.

While the configuration server attempts to configure the target platform appropriately, problems may still arise. For instance, if there is not enough capacity for the next increment in the target platform, the configuration server may make API calls pertinent to the given cloud vendor of the target platform to sufficiently increase the capacity.

FIG. 1A is an architectural diagram illustrating an initial state of a platform migration system 100 during a full platform migration, according to an embodiment of the present invention. System 100 includes a legacy platform 110 running NFs 112, 114, . . . , 116 and a target platform 120. A configuration server 130 will provide configurations for target platform 120 and an NRF 140 (e.g., running on one or more servers) is located remotely from platforms 110, 120.

Figure 1B:
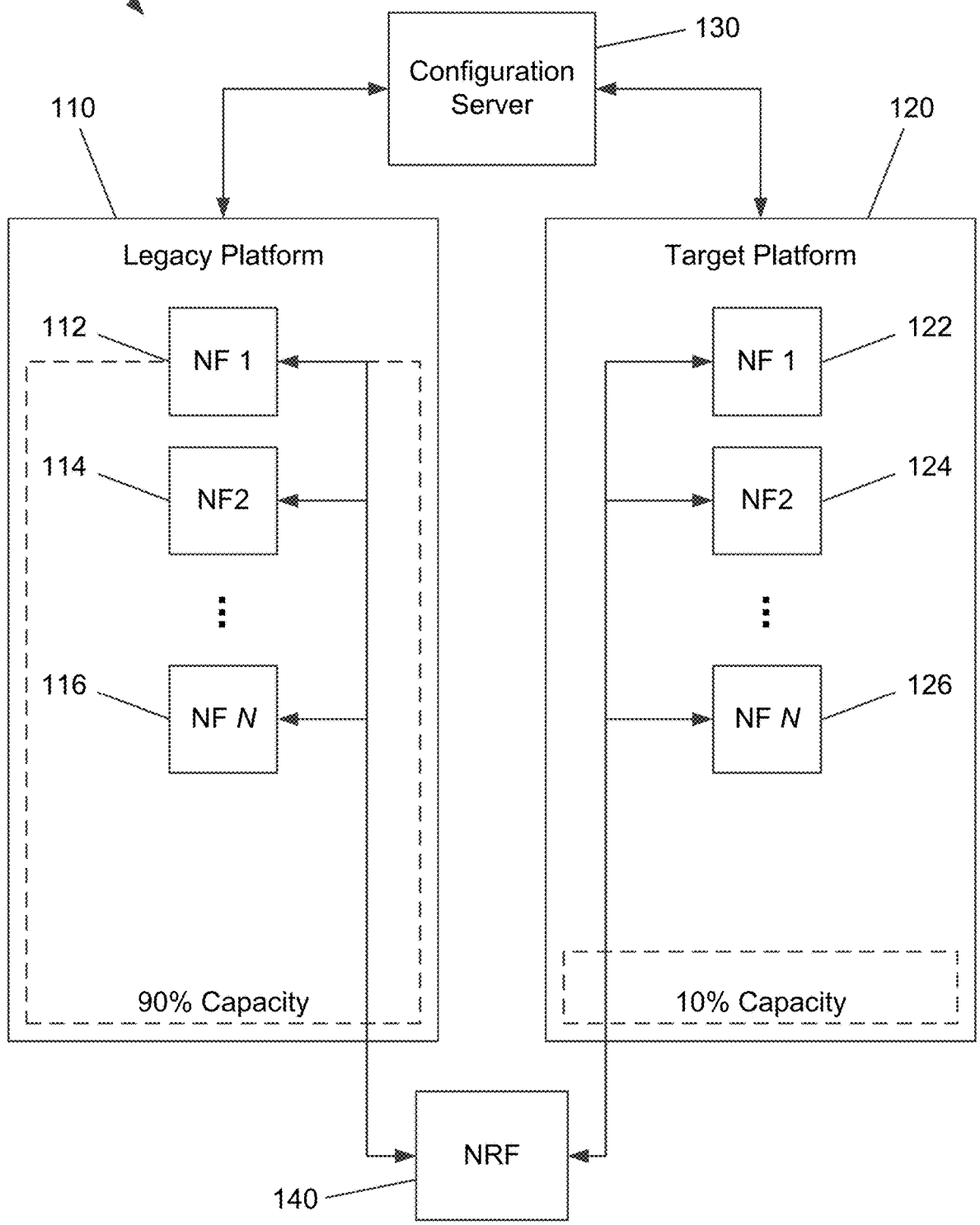
FIG. 1B is an architectural diagram illustrating a first incremental state of the platform migration system during the full platform migration, according to an embodiment of the present invention.

Turning to FIG. 1B, configuration server 130 sets up target platform 120 to have corresponding NFs 122, 124, . . . , 126 that are registered with and discoverable by NRF 140. The NRF also maintains the health status of the NFs and keeps track of the load level of the NFs. Furthermore, in some embodiments, the network supports a redundancy/resiliency model in legacy platform 110 and target platform 120 so when one NF of a platform is down, another NF in the same environment (i.e., legacy platform 110 or target platform 120) can pick up the responsibilities of the failed NF.

Figure 1C:
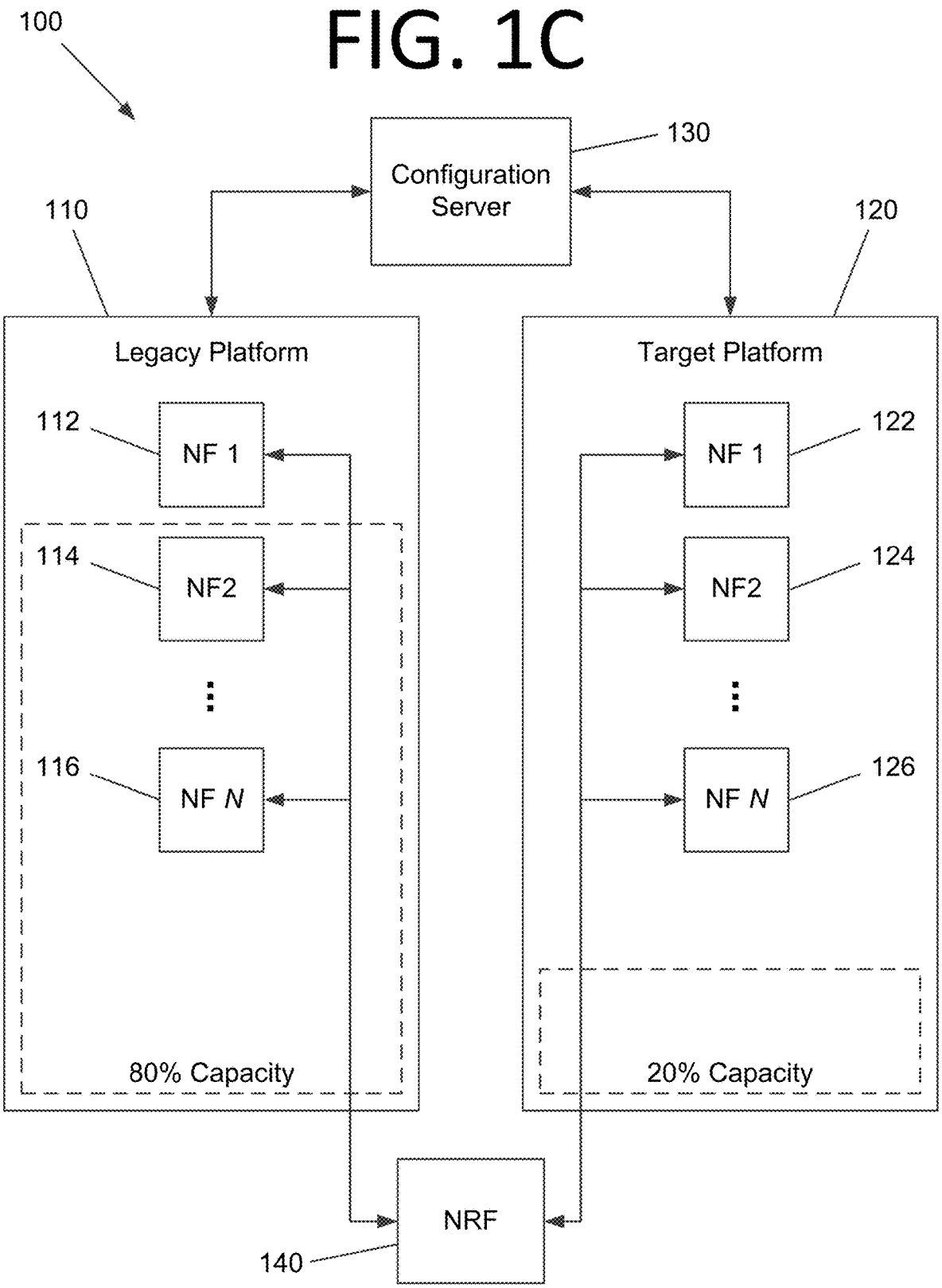
FIG. 1C is an architectural diagram illustrating a second incremental state of the platform migration system during the full platform migration, according to an embodiment of the present invention.

Initially, target platform 120 is running at 10% of the capacity of legacy platform 110. Both platforms 110, 120 are tested to ensure that they are operating as intended. The second increment of the platform migration process is shown in FIG. 1C, where legacy platform 110 is operating at 80% capacity and target platform 120 is operating at 20% capacity. It should be noted that the capacities of legacy platform 110 and target platform 120 may be different from one another in some embodiments.

Figure 1D:
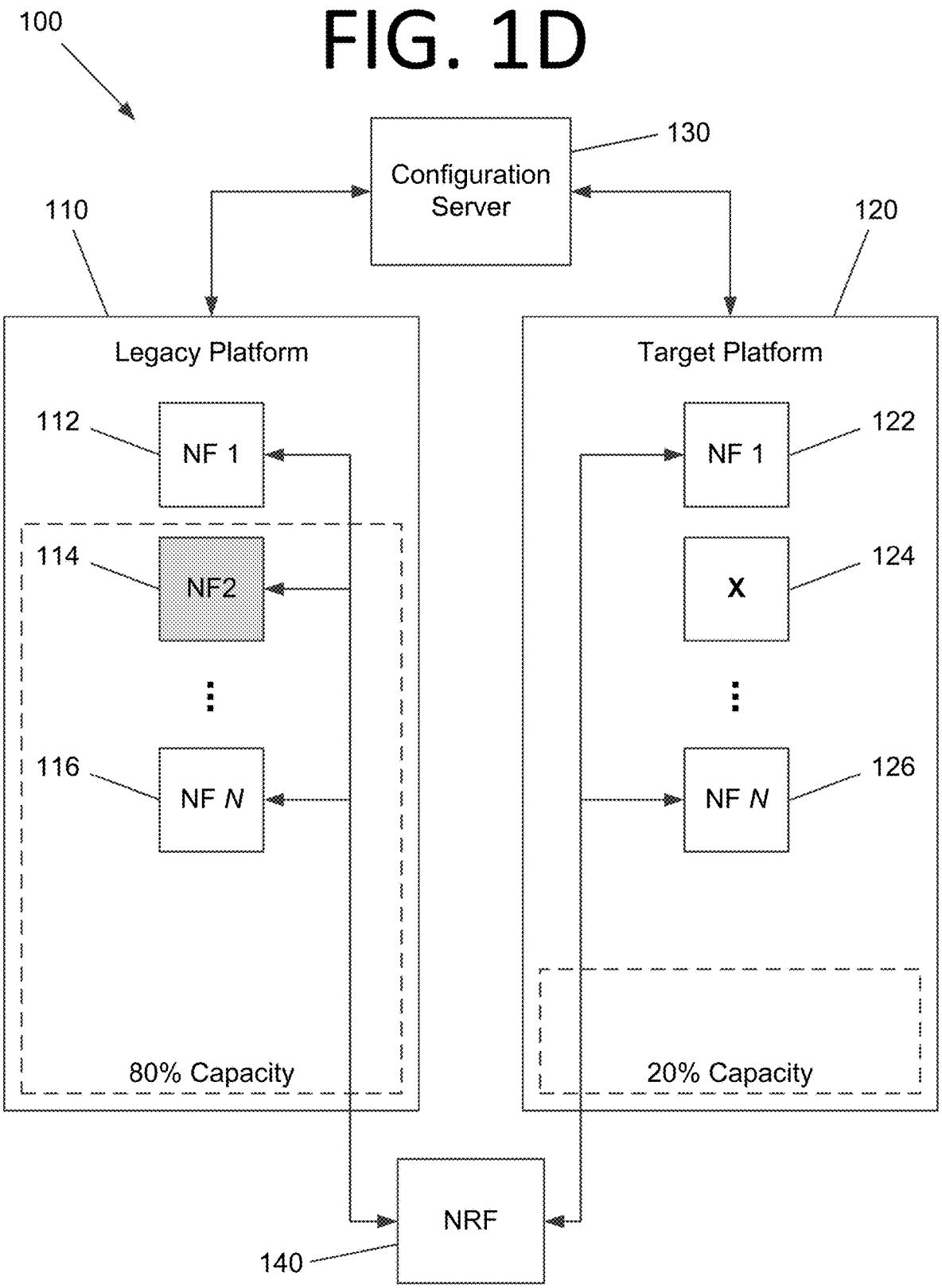
FIG. 1D is an architectural diagram illustrating a failure scenario where a single NF on the target platform has failed, according to an embodiment of the present invention.

Turning to FIG. 1D, a failure scenario is shown where NF 124 has failed. NF 124 may be in its own cluster, and thus not affect the operation of NFs 122, . . . , 126. In this case, NRF 140 detects that NF 124 is no longer available and routes all requests for the services of the respective NF to NF 114.

Figure 1E:
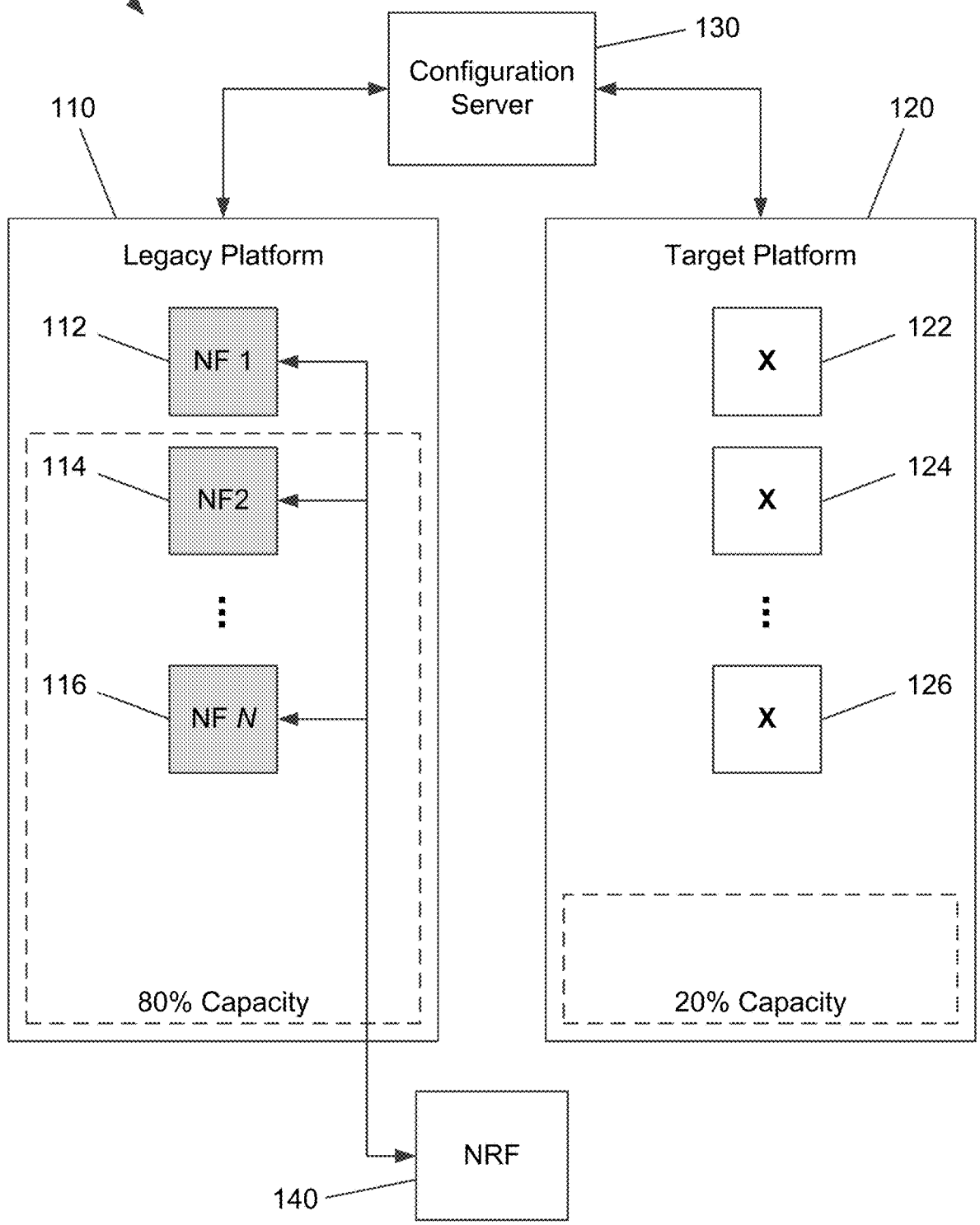
FIG. 1E is an architectural diagram illustrating a failure scenario where all NFs on the target platform have failed, according to an embodiment of the present invention.

Turning to FIG. 1E, a failure scenario is shown where target platform 120 is down. For instance, all NFs 122, 124, . . . , 126 may be in a single cluster and a memory leak caused by NF 124 may have caused a cluster failure. NRF 140 detects that NFs 122, 124, . . . , 126 are no longer available and routes all requests for the respective services to NFs 112, 114, . . . , 116.

In the scenario of FIG. 1E, a different architectural design may have prevented the complete failure of target platform 120. FIG. 1F shows such a solution, where NFs 122, . . . , 126 operate in a first cluster 127 and failure-prone NF 124 operates in a second cluster 128. In this manner, any future failures of cluster 128 caused by NF 124 will not affect cluster 127 and NFs 122, . . . , 126 while engineers investigate the issue.

Figure 1G:
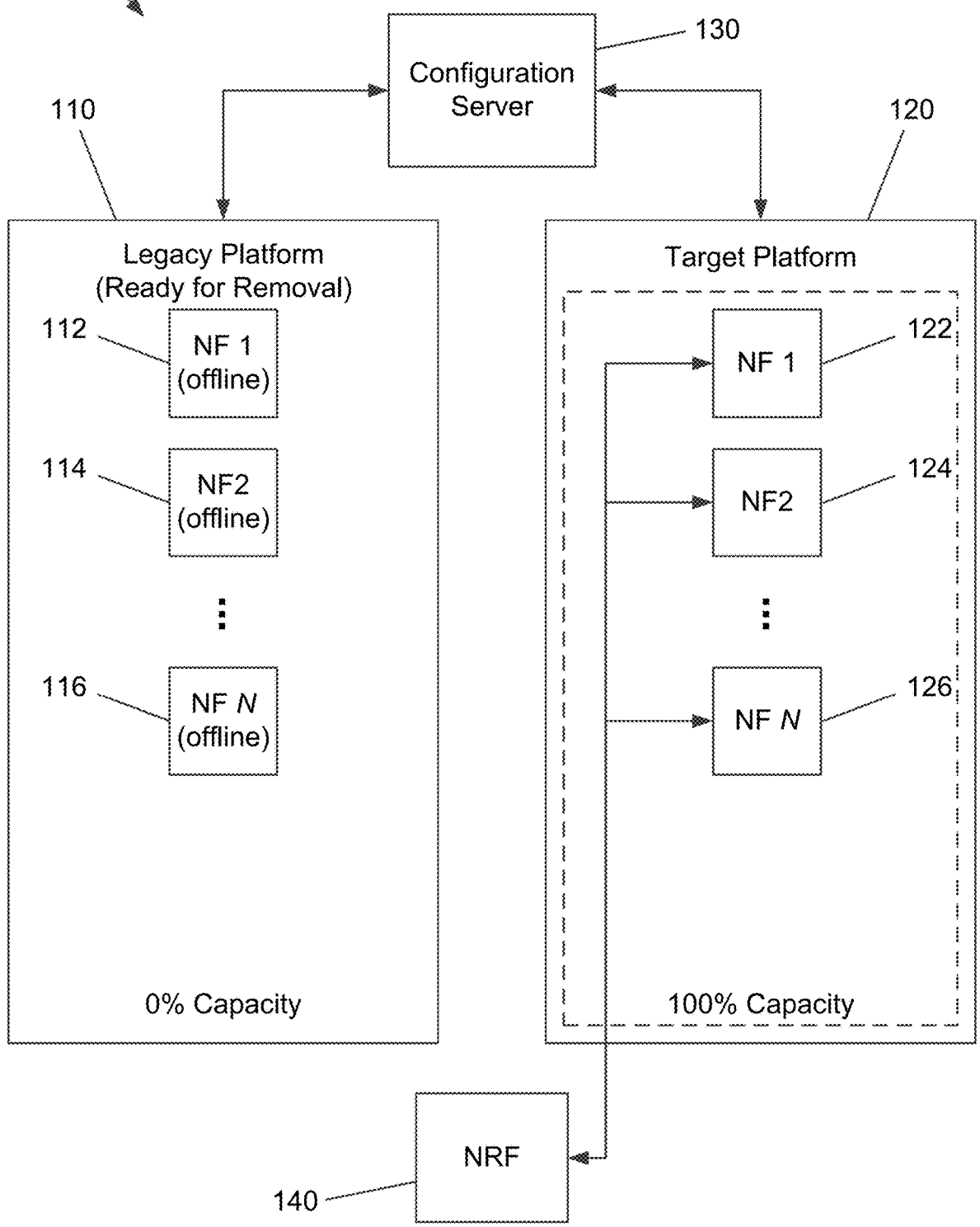
FIG. 1G is an architectural diagram illustrating the platform migration system after the full migration, according to an embodiment of the present invention.

Turning to FIG. 1G, the full migration from legacy platform 110 to target platform 120 has been completed. NRF 140 no longer detects the presence of NFs 112, 114, . . . , 116 and removes them. Target platform 110 now fully replaces legacy platform 120, and NFs 112, 114, . . . , 116 and legacy platform 110 can be taken down.

FIG. 2A is an architectural diagram illustrating an initial increment in a platform migration system 200 during migration of a subset of NFs, according to an embodiment of the present invention. As with FIGS. 1A-G, platform migration system 200 includes a legacy platform 210, a target platform 220, a configuration server 230, and an NRF 240. However, in this embodiment, NFs 222, 224 of target platform 220 correspond to NFs 212, 214 of legacy platform 210, and only these NFs are being migrated. The remaining NFs, including NF 216, will remain on legacy platform 210.

During migration, the capacity of legacy platform 210 will be reduced by some amount (here, arbitrarily 40%). Target platform 220, once migration is completed, will have sufficient capacity to run NFs 222, 224. In some embodiments, the reduction in capacity of legacy platform 210 may not be the same as the full capacity of target platform 220. For instance, target platform 220 may be more efficient for NFs 222, 224, target platform 220 may have a different architecture and/or computing systems, etc.

Figure 2B:
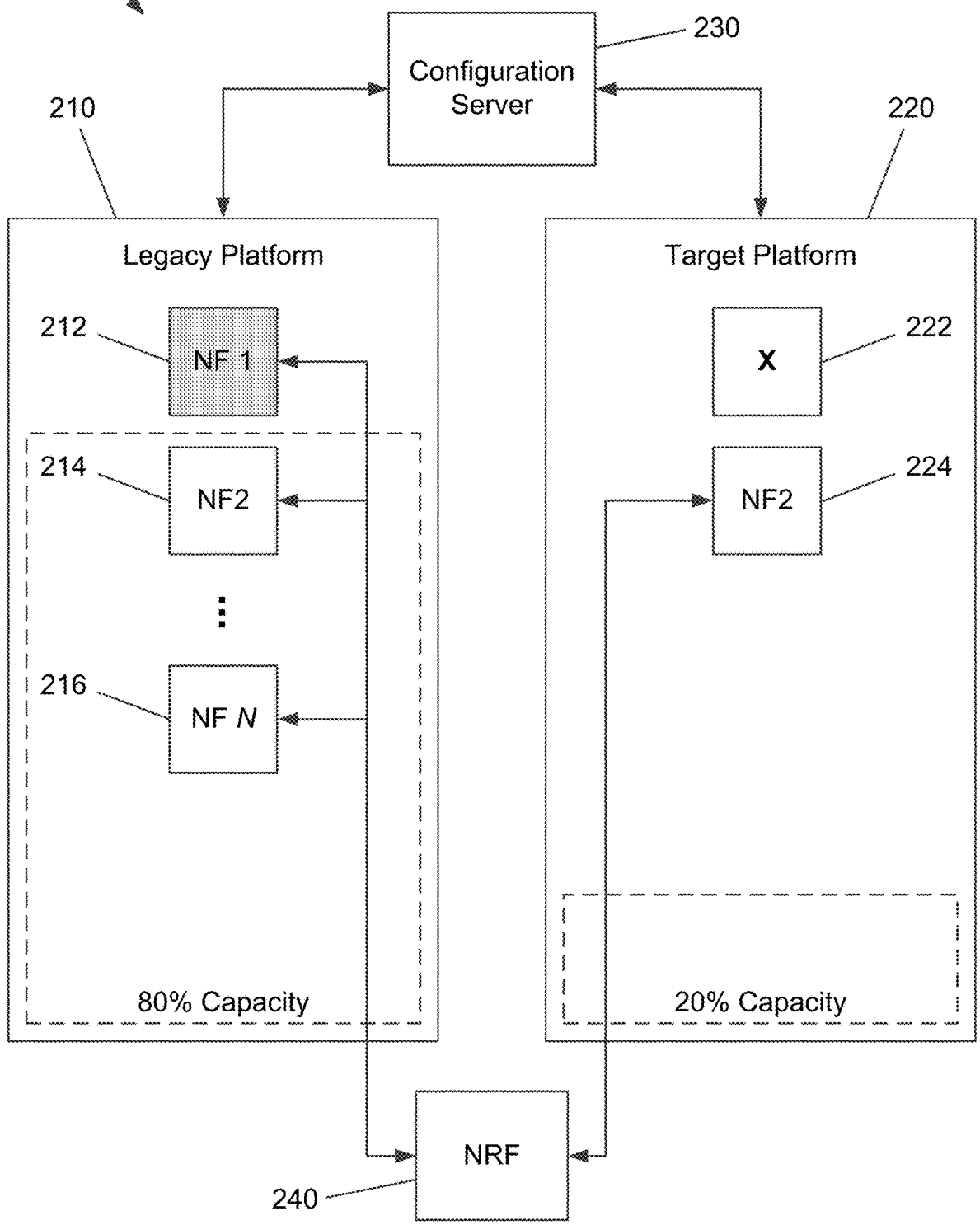
FIG. 2B is an architectural diagram illustrating a failure scenario where a single NF on the target platform has failed, according to an embodiment of the present invention.

Turning to FIG. 2B, a failure scenario is shown where NF 222 has failed. NF 222 may be in its own cluster, and thus not affect the operation of NF 224. In this case, NRF 240 detects that NF 222 is no longer available and routes all requests for the services of the respective NF to NF 212.

Figure 2C:
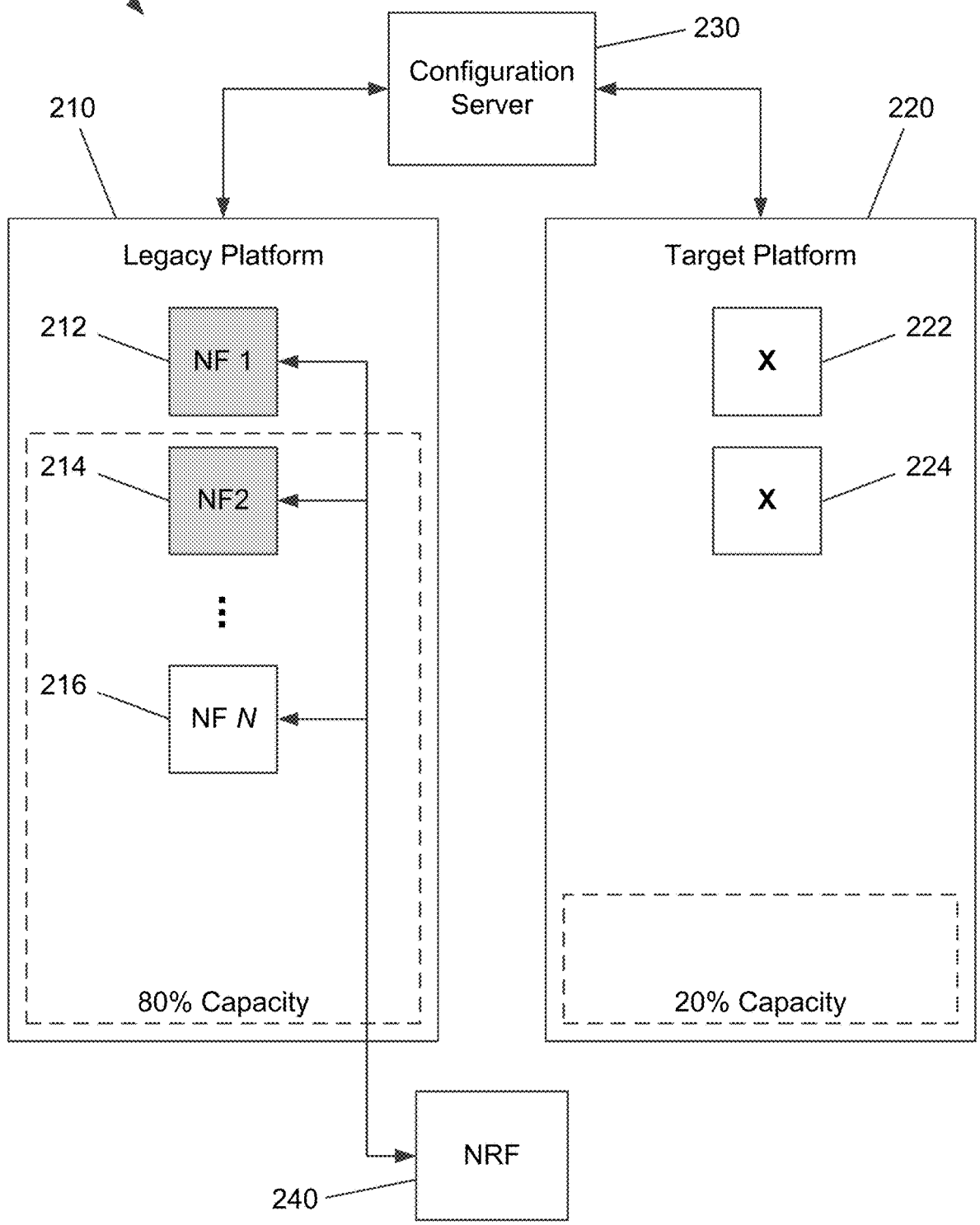
FIG. 2C is an architectural diagram illustrating a failure scenario where both NFs on the target platform have failed, according to an embodiment of the present invention.

Turning to FIG. 2C, a failure scenario is shown where target platform 220 is down. For instance, NFs 222, 224 may be in a single cluster and a memory leak caused by NF 222 may have caused a cluster failure. NRF 240 detects that NFs 222, 224 are no longer available and routes all requests for the respective services to NFs 212, 214.

Figure 2D:
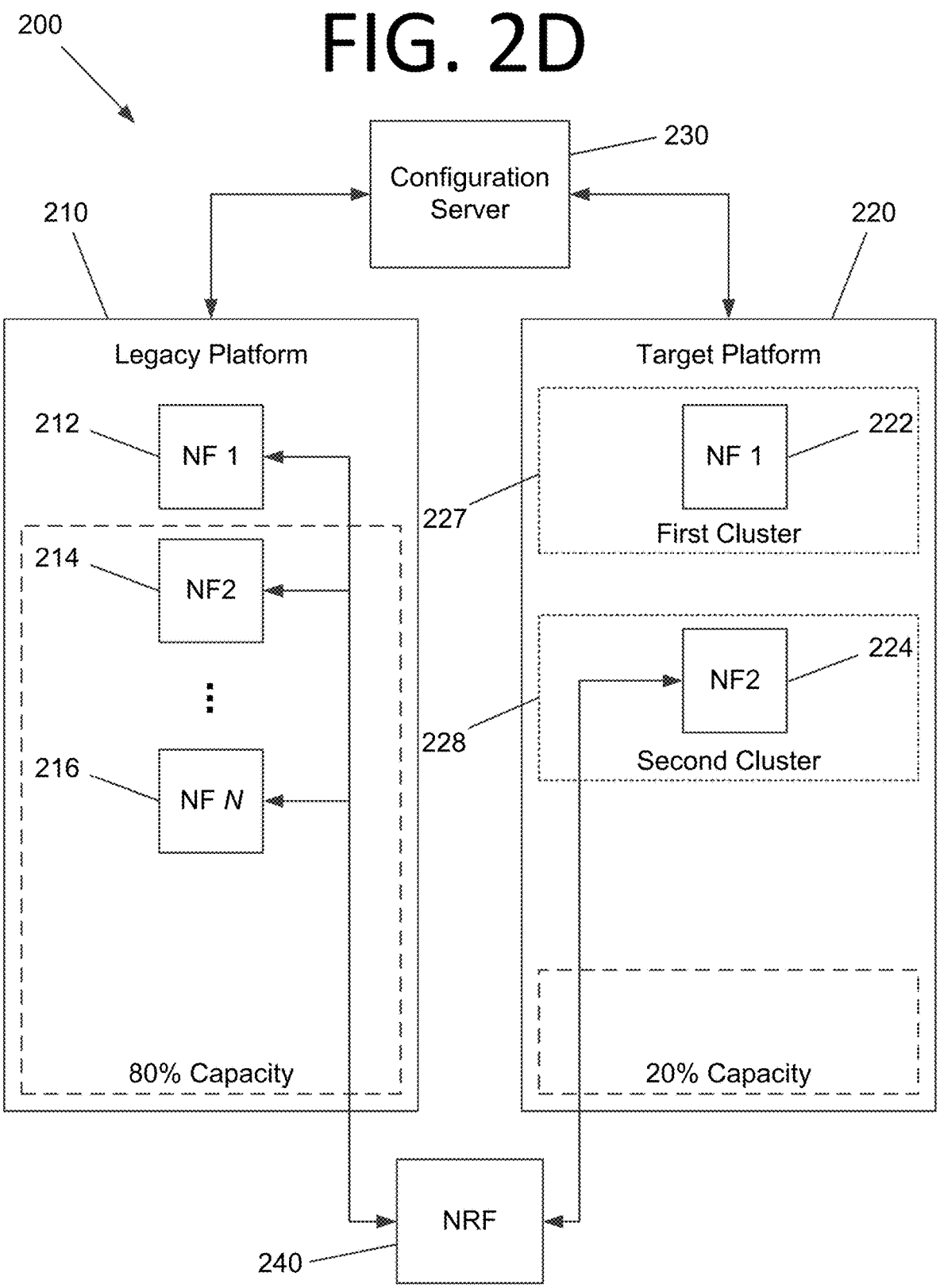
FIG. 2D is an architectural diagram illustrating a multi-cluster solution to the failure scenario of FIG. 2C, according to an embodiment of the present invention.

In the scenario of FIG. 2C, a different architectural design may have prevented the complete failure of target platform 220. FIG. 2D shows such a solution, where failure-prone NF 222 operates in a first cluster 227 and NF 224 operates in a second cluster 228. In this manner, any future failures of cluster 227 caused by NF 222 will not affect cluster 228 and NF 224 while engineers investigate the issue.

Figure 2E:
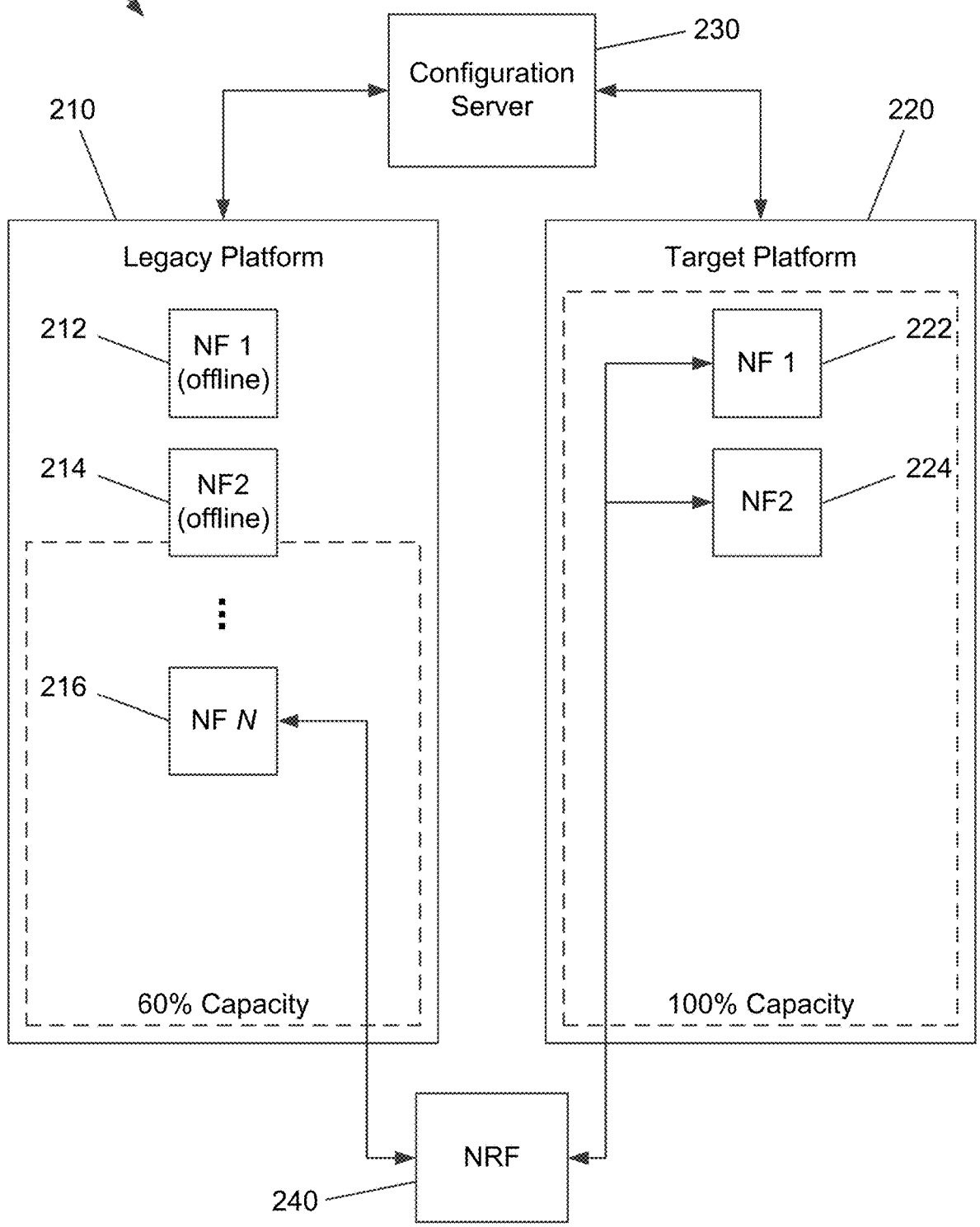
FIG. 2E is an architectural diagram illustrating the platform migration system after the full migration of the two NFs is completed, according to an embodiment of the present invention.

Turning to FIG. 2E, the full migration of NFs 212, 214 from legacy platform 210 to target platform 220 has been completed. NRF 240 no longer detects the presence of NFs 212, 214 and removes them. NFs 222, 224 now fully replace NFs 212, 214, and NFs 212, 214 can be removed entirely.

FIG. 3 is an architectural diagram illustrating a telecommunications system 300, according to an embodiment of the present invention. User equipment (UE) 310 (e.g., a mobile phone, a tablet, a laptop computer, etc.) communicates with a Radio Access Network (RAN) 320. RAN 320 sends communications to UE 310, as well as from UE 310 into the core carrier network. In some embodiments, communications are sent to/from RAN 320 via a Performance Edge Data Center (PEDC) 330 to provide lower latency. However, in some embodiments, RAN 320 communicates directly with a Breakout Edge Data Center (BEDC) 340 or a Regional Data Center (RDC) 350. BEDCs are typically smaller data centers that are proximate to the populations they serve. BEDCs may break out User Plane Function data traffic (UPF-d) and provide cloud computing resources and cached content to UE 310, such as providing NF application services for gaming, enterprise applications, etc. In certain embodiments, RAN 320 may include a Local Data Center (LDC) (not shown) that hosts one or more Distributed Units (DUs) in a 5G Open RAN (O-RAN) architecture.

The carrier network may provide various NFs and other services. For instance, BEDC 340 may provide cloud computing resources and cached content to mobile device 310, such as providing NF application services for gaming, enterprise applications, etc. An RDC 350 may provide core network functions, such as UPF for voice traffic (UPF-v), UPF-d (if not in PEDC 330 or BEDC 340, for example), Session Management Function (SMF), and Access and Mobility Management Function (AMF) functionality. The SMF includes Packet Data Network Gateway (PGW) Control Plane (PGW-C) functionality. The UPF includes PGW User Data Plane (PGW-U) functionality.

A National Data Center (NDC) 360 may provide a Unified Data Repository (UDR) and user verification services, for example. Other network services that may be provided may include, but are not limited to, Short Message Service Function (SMSF), Internet Protocol (IP) Multimedia Subsystem (IMS)+Telephone Answering Service (TAS), IP-SM Gateway (IP-SM-GW) (the network functionality that provides the messaging service in the IMS network), Enhanced Serving Mobile Location Center (E-SMLC), Home Subscriber Server (HSS), HSS+Unified Data Management (UDM), Short Message Service Center (SMSC), and/or Policy Control Function (PCF) functionality. It should be noted that additional and/or different network functionality may be provided without deviating from the present invention. The various functions in these systems may be performed using dockerized clusters in some embodiments.

BEDC 340 may utilize other data centers for NF authentication services. RDC 350 receives NF authentication requests from BEDC 340. This helps with managing user traffic latency, for instance. However, RDC 350 may not perform NF authentication in some embodiments.

From RDC 350, NF authentication requests may be sent to NDC 360, which may be located far away from UE 310, RAN 320, PEDC 330, BEDC 340, and RDC 350. NDC 360 may provide a UDR, and user verification may be performed at NDC 360. In some embodiments, mobile device 710 and/or computing systems of RAN 320, PEDC 330, BEDC 340, RDC 350, and/or NDC 360 may be computing system 500 of FIG. 5.

A cloud provider 370 may host the legacy platform, the target platform, or both in some embodiments. Alternatively, PEDC 330, BEDC 340, RDC 350, and/or NDC 360 may host the legacy platform and/or the target platform. The NRF may be located on computing systems of PEDC 330, BEDC 340, RDC 350, and/or NDC 360. When NFs are hosted by cloud provider 370, the NRF may expose these NFs for use by other NFs or service consumers.

FIG. 4A is a flow diagram illustrating a process 400 for performing incremental platform migration, according to an embodiment of the present invention. The process begins with determining a configuration for a target platform 440 by a configuration server 420. Configuration server 420 then sends corresponding configuration file(s) to target platform 440, which configures itself accordingly. An example of a YAML configuration file is provided below. <I HAVE TRIED TO MAKE THIS CONFIGURATION EXAMPLE MORE GENERIC—PLEASE FEEL FREE TO CHANGE ANY DISH-SPECIFIC INFORMATION THAT I MAY HAVE MISSED>

```
global:
    dockerRegistry: docker.dockerhub-phx.oci.oracle.com
    logStorage: 0 #default calculated value 70
    crictlStorage: 0 #default calculated value 1
mysql:
    primary:
        host: "ocnssf-mysql"
    secondary:
        host: "ocnssf-mysql"
    port: 3306
replicaCount: 1
image:
    pullPolicy: Always
service:
    type: ClusterIP
    port: 1234
logging:
    level:
        root: ERROR
        nsavailability: INFO
resources:
    limits:
        ephemeralStorage: "1Gi"
        cpu: 1
        memory: 1Gi
    requests:
        ephemeralStorage: "78.1Mi"
        cpu: 1
        memory: 1Gi
    target:
        averageCpuUtil: 10
hooks:
    limits:
        cpu: 512Mi
        memory: 500m
    requests:
        cpu: 256Mi
        memory: 250m
minReplicas: 2
maxReplicas: 12
maxExpiryDuration: 240
minExpiryDuration: 0
minAvailable: 1
contentEncodingEnabled: true
compressionMinimumResponseSize: 1024
maxRequestSize: 1 MB
continueOnError: true
initializationMode: always
hikariPoolSize: 10
hikariConnectionTimeout: 10000
hikariMinimumIdle: 1
hikariIdleTimeout: 420000
hikariMaxLifetime: 540000
showSql: false
ioThreads: 10
workerThreads: 20
corePoolSize: 32
maxPoolSize: 64
queueCapacity: 1000
commonServiceName: nsavailability
notificationHandlerUrl: http://ocnssf-ingress:80
delayedNotificationEnabled: false
notificationDelay: 5000
```

Once configured, configuration server 420 instructs target platform 440 to increase its capacity by a first target platform increment. Target platform 440 allocates this capacity and sets up the NF(s) that will be hosted thereon. An NRF 430 then registers the NF(s) of target platform 440. For instance, NRF 430 may execute Nnrf_NFManagement_NFRegister service operations for the NF(s), creating respective NF profiles (e.g., with the NF type, the NF instance identifier (ID), the NF service names, the Public Land Mobile Network (PLMN) ID and addressing information, etc.). NRF 430 has also previously registered the NFs of a legacy platform 410 in this example.

Configuration server 420 also instructs legacy platform 410 to reduce its capacity by a first increment. As noted previously, the capacity increase for target platform 440 and the capacity decrease by legacy platform 410 may not be the same amount. Legacy platform 410 then reduces its capacity accordingly.

The process of incrementally increasing the capacity of target platform 440 and incrementally decreasing the capacity of legacy platform 410 is repeated until target platform 440 is running at full capacity and legacy platform 410 is running at the desired reduced capacity if a subset of its NFs is being transferred to target platform 440 or all NFs of legacy platform 410 have been migrated to target platform 440. Also, during this capacity adjustment of legacy platform 410 and target platform 420, a load-balancing mechanism distributes the load between legacy platform 410 and target platform 420 to the desired capacities using a weighted algorithm (e.g., weighted round robin, weighted fair-queuing, etc.). NRF 430 then removes the corresponding NF(s) (or all NFs if a full migration) of legacy platform 410. This may be done by NRF 430 via Nnrf_NFManagement_NFDeregister service operation(s).

FIG. 4B is a flow diagram illustrating a process 402 for detecting and addressing NF failure, according to an embodiment of the present invention. During an increment of the platform migration process, one or more NFs of target platform 440 or the entire platform may fail. NRF 430 sends a message to the NF(s) of target platform 440 and detects failure by determining that corresponding responses were not received. NRF 430 removes (i.e., deregisters) the nonresponsive NF(s) and routes requests for the respective NF service(s) to the corresponding NF(s) of legacy platform 410.

In some embodiments, redundancy and resiliency are supported by both legacy platform 410 and target platform 420. If one NF in legacy platform 410 or target platform 420 is down, for example, but the respective platform is still running and has a redundant NF that performs the same function, the redundant NF picks up for the failed NF. Either an NRF health check or redundancy can be used to address failed NFs.

Once the issue is repaired, the NF(s) of target platform 440 register with NRF 430. This may be done via Nnrf_NF-Management_NFRegister service operations, per the above. NRF 430 then distributes service requests to the respective NF(s) of target platform 440 and legacy platform 410 in accordance with a platform migration policy.

In some embodiments, the NFs are containerized NFs and the configuration file(s) are YAML files including configurations for NF services. In certain embodiments, the amount of the initial capacity allocation of the target platform and the amount of the initial capacity reduction of the legacy platform are different. In some embodiments, the migration policy includes load balancing for service requests for the NF(s) of the target platform and the corresponding NF(s) of the legacy platform, an indication of a preference to use the NF(s) of the target platform while the target platform has sufficient capacity, or both.

Figure 5:
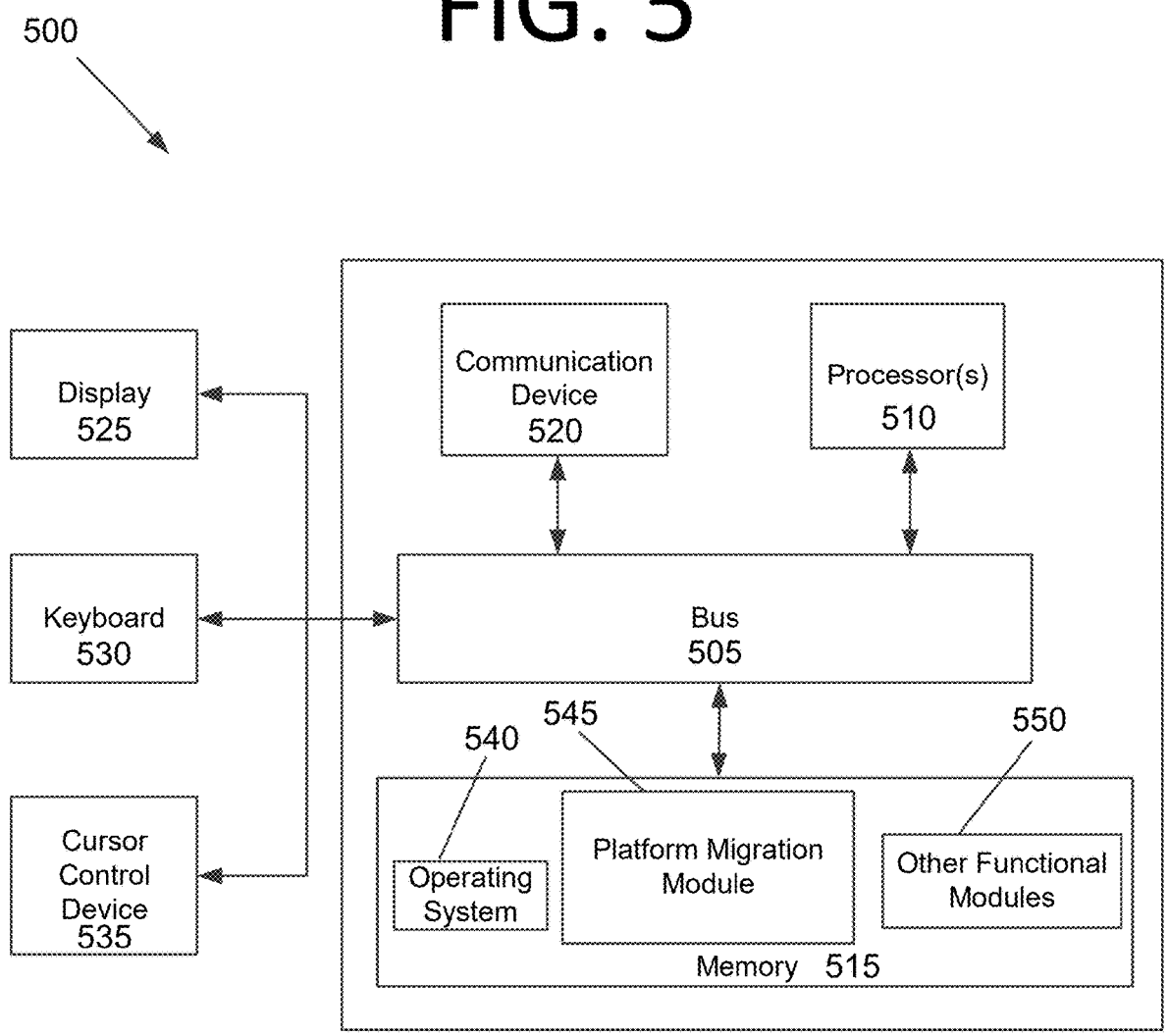
FIG. 5 is an architectural diagram illustrating a computing system configured to participate in an incremental platform migration process, according to an embodiment of the present invention.

FIG. 5 is an architectural diagram illustrating a computing system 500 configured to participate in an incremental platform migration process, according to an embodiment of the present invention. In some embodiments, computing system 500 may be one or more of the computing systems depicted and/or described herein, such as a configuration server, an NRF server, a server of a target platform or a legacy platform, another carrier network server or other type of computing system, etc. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes memory 515 for storing information and instructions to be executed by processor(s) 510. Memory 515 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a failure management module 545 that is configured to perform all or part of the processes described herein or derivatives thereof. Computing system 500 may include one or more additional functional modules 550 that include additional functionality.

One skilled in the art will appreciate that a "computing system" could be embodied as a server, an embedded computing system, a personal computer, a console, a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6A:
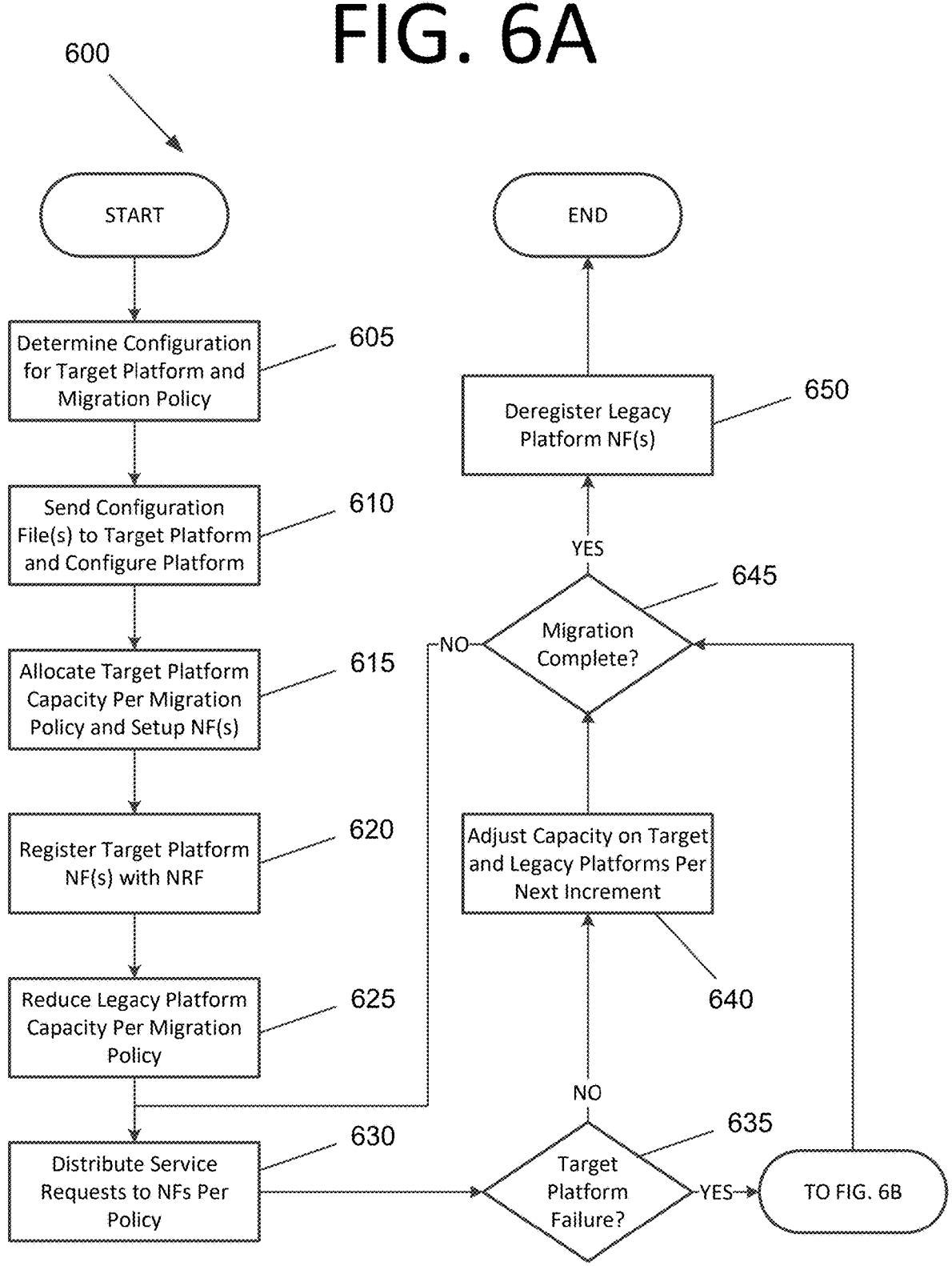

FIGS. 6A and 6B are flowcharts illustrating a process 600 for performing incremental platform migration, according to an embodiment of the present invention. The process begins with determining a configuration for a target platform and a migration policy at 605. Configuration file(s) are then sent to the target platform, which is configured accordingly at 610. The initial increment of the target platform capacity is allocated per the migration policy and the NF(s) to be hosted on the target platform are setup at 615. The target platform NF(s) are then registered with an NRF at 620, which also has previously registered the legacy platform NFs and is able to access (and is accessible by) both platforms. The legacy platform capacity is also reduced according to be first increment of the migration policy at 625.

The NRF distributes service requests to the NFs of the target platform and legacy platform in accordance with the migration policy at 630. For instance, load balancing for service requests for NF(s) that the target and legacy platforms have in common may be performed based on the respective capacities of the target and legacy platform, the target platform may be preferred for its NF(s) so long as it has sufficient capacity, etc. If the target platform operates successfully for some period of time in accordance with the migration policy for the first increment at 635, The capacities of the target platform and legacy platform are increased and reduced, respectively, for the next increment at 640, and if migration is not complete at 645, the process returns to step 630. If the migration is complete at 645, the legacy platform NF(s) corresponding to the NF(s) of the target platform are deregistered at 650. In the case of a full migration, the target platform may then be completely taken down.

If one or more NFs of the target platform fail at step 635, however, the process proceeds to step 655 of FIG. 6B, where the NRF deregisters the failed NF(s) of the target platform. The NRF routes all service requests for the failed NF(s) to corresponding NF(s) of the legacy platform at 660. The issue(s) that caused the failure are addressed at 665, and the restored NF(s) are registered at 670. The process then proceeds to step 645 of FIG. 6A.

The process steps performed in FIGS. 4A, 4B, 6A, and 6B may be performed by computer program(s), encoding instructions for the processor(s) to perform at least part of the process(es) described in FIGS. 4A, 4B, 6A, and 6B in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 510 of computing system 500 of FIG. 5) to implement all or part of the process steps described in FIGS. 4A, 4B, 6A, and 6B which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A platform migration system for a telecommunications network, comprising:
one or more servers of a legacy platform running a plurality of Network Functions (NFs);
one or more servers of a target platform;
one or more Network Repository Function (NRF) servers that provide an NRF through which the plurality of NFs of the legacy platform are registered in the telecommunications network; and
a configuration server configured to manage migration of one or more of the plurality of NFs of the legacy platform to the target platform using a migration policy, wherein
the configuration server provides one or more configuration files to the target platform,
the one or more servers of the target platform implement the migration policy using the one or more configuration files, setup one or more NFs, and allocate an initial capacity for the target platform, the one or more servers of the target platform are configured to allocate a next increment of capacity for the target platform in accordance with the migration policy,
the one or more servers of the legacy platform reduce a capacity of the legacy platform by a first increment, and the one or more servers of the legacy platform are configured to deallocate a next increment of capacity for the legacy platform in accordance with the migration policy after the target platform and the legacy platform operate nominally for a predetermined period of time in accordance with the migration policy, and
the NRF distributes service requests to the one or more NFs of the target platform and one or more corresponding NFs of the plurality of NFs of the legacy platform in accordance with the migration policy.

2. The platform migration system of claim 1, wherein the one or more servers of the legacy platform reduce the capacity of the legacy platform by the first increment using auto-scaling of a platform for automating deployment, scaling, and management of containerized applications.

3. The platform migration system of claim 1, wherein after completion of the platform migration, the NRF is configured to deregister the one or more corresponding NFs of the plurality of NFs of the legacy platform.

4. The platform migration system of claim 1, wherein
the one or more servers of the legacy platform and the one or more servers of the target platform run their respective NFs as containerized NFs, and
the one or more configuration files are Yet Another Markup Language (YAML) files comprising configurations for NF services.

5. The platform migration system of claim 1, wherein an amount of the initial capacity allocation of the target platform and the first increment of the capacity of the legacy platform are different.

6. The platform migration system of claim 1, wherein the migration policy comprises load balancing for service requests for the one or more NFs of the target platform and the one or more corresponding NFs of the legacy platform, an indication of a preference to use the one or more NFs of the target platform while the target platform has sufficient capacity, or both.

7. The platform migration system of claim 6, wherein the load balancing comprises distributing a load between the legacy platform and the target platform proportional to respective capacities of the legacy platform and the target platform using a weighted load balancing algorithm.

8. The platform migration system of claim 1, wherein responsive to an NF of the one or more NFs of the target platform failing, the NRF is configured to:
deregister the failed NF; and
route service requests for the failed NF to a corresponding NF of the plurality of NFs of the legacy platform.

9. The platform migration system of claim 8, wherein responsive to the failed NF of the target platform being restored, the NRF is configured to:
register the restored NF; and
route service requests to the restored NF and the corresponding NF of the legacy platform in accordance with the migration policy.

10. A plurality of non-transitory computer-readable media storing a plurality of computer programs, the plurality of computer programs configured to cause a plurality of processors to:
configure a target platform in accordance with a migration policy in one or more configuration files;
setup one or more Network Functions (NFs) on the target platform;

allocate an initial increment of capacity to the target platform, and allocate a next increment of capacity for the target platform in accordance with the migration policy;

reduce a capacity of a legacy platform by an initial increment, and deallocate a next increment of capacity for the legacy platform in accordance with the migration policy after the target platform and the legacy platform operate nominally for a predetermined period of time in accordance with the migration policy;

register the one or more NFs of the target platform with a Network Repository Function (NRF); and distribute service requests, via the NRF, to the one or more NFs of the target platform and one or more corresponding NFs of the legacy platform in accordance with the migration policy.

11. The plurality of non-transitory computer-readable media of claim 10, wherein one or more computer programs of the plurality of computer programs are configured reduce the capacity of the legacy platform by the first increment using auto-scaling of a platform for automating deployment, scaling, and management of containerized applications.

12. The plurality of non-transitory computer-readable media of claim 10, wherein after completion of the platform migration, one or more computer programs of the plurality of computer programs are further configured to cause the plurality of processors to:

deregister the one or more corresponding NFs of the legacy platform, by the NRF.

13. The plurality of non-transitory computer-readable media of claim 10, wherein the legacy platform and the target platform run respective NFs as containerized NFs, and the one or more configuration files are Yet Another Markup Language (YAML) files comprising configurations for NF services.

14. The plurality of non-transitory computer-readable media of claim 10, wherein the migration policy comprises load balancing for service requests for the one or more NFs of the target platform and one or more corresponding NFs of the legacy platform, an indication of a preference to use the one or more NFs of the target platform while the target platform has sufficient capacity, or both, and the load balancing comprises distributing a load between the legacy platform and the target platform proportional to respective capacities of the legacy platform and the target platform using a weighted load balancing algorithm.

15. The plurality of non-transitory computer-readable media of claim 10, wherein responsive to an NF of the one or more NFs of the target platform failing, one or more computer programs of the plurality of computer programs are further configured to cause the plurality of processors to:

deregister the one or more failed NFs, by the NRF; and route service requests for the one or more failed NFs to a corresponding NF of the plurality of NFs of the legacy platform, by the NRF.

16. The plurality of non-transitory computer-readable media of claim 15, wherein responsive to the failed NF of the target platform being restored, one or more computer programs of the plurality of computer programs further are configured to cause the plurality of processors to:

register the restored NF, by the NRF; and route service requests to the restored NF and the corresponding NF of the legacy platform in accordance with the migration policy, by the NRF.

17. A computer-implemented method for performing platform migration for a telecommunications network, comprising:

configuring a target platform in accordance with a migration policy in one or more configuration files, by a plurality of computing systems;

setting up one or more Network Functions (NFs) on the target platform, by the plurality of computing systems;

allocating an initial increment of capacity to the target platform, by the plurality of computing systems;

reducing a capacity of a legacy platform by an initial increment, by the plurality of computing systems;

registering the one or more NFs of the target platform with a Network Repository Function (NRF), by the plurality of computing systems;

distributing service requests, via the NRF, to the one or more NFs of the target platform and one or more corresponding NFs of the legacy platform in accordance with the migration policy, by the plurality of computing systems;

allocating a next increment of capacity for the target platform in accordance with the migration policy and deallocating a next increment of capacity for the legacy platform in accordance with the migration policy after the target platform and the legacy platform operate nominally for a predetermined period of time in accordance with the migration policy, by the plurality of computing systems; and after completion of the platform migration, deregistering the one or more corresponding NFs of the legacy platform via the NRF, by the plurality of computing systems.

18. The computer-implemented method of claim 17, wherein the migration policy comprises load balancing for service requests for the one or more NFs of the target platform and the one or more corresponding NFs of the legacy platform, an indication of a preference to use the one or more NFs of the target platform while the target platform has sufficient capacity, or both, and the load balancing comprises distributing a load between the legacy platform and the target platform proportional to respective capacities of the legacy platform and the target platform using a weighted load balancing algorithm.

* * * * *